United States Patent
Surprise et al.

(10) Patent No.: US 10,831,967 B1
(45) Date of Patent: Nov. 10, 2020

(54) LOCAL CLOCK BUFFER CONTROLLER PLACEMENT AND CONNECTIVITY

(71) Applicant: INTERNATIONAL BUSINESS MACHINES CORPORATION, Armonk, NY (US)

(72) Inventors: Jesse Surprise, Highland, NY (US); Gerald Strevig, III, Cedar Park, TX (US); Shawn Kollesar, Poughkeepsie, NY (US); Michael Kazda, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/567,128

(22) Filed: Sep. 11, 2019

(51) Int. Cl.
| | |
|---|---|
| *G06F 30/00* | (2020.01) |
| *G06F 30/392* | (2020.01) |
| *G06F 30/30* | (2020.01) |
| *G06F 111/20* | (2020.01) |

(52) U.S. Cl.
CPC ............ *G06F 30/392* (2020.01); *G06F 30/30* (2020.01); *G06F 2111/20* (2020.01)

(58) Field of Classification Search
CPC ........ G06F 30/392; G06F 30/19; G06F 30/30; G06F 2111/20
See application file for complete search history.

(56) References Cited

U.S. PATENT DOCUMENTS

| | | | |
|---|---|---|---|
| 6,230,304 B1 | 5/2001 | Groeneveld et al. | |
| 6,440,780 B1 * | 8/2002 | Kimura | G06F 30/39 438/129 |
| 6,449,759 B1 * | 9/2002 | Whitney | G06F 30/327 716/114 |
| 6,701,507 B1 * | 3/2004 | Srinivasan | G06F 30/39 716/114 |
| 6,769,104 B2 * | 7/2004 | Rodgers | G06F 30/394 327/295 |
| 7,051,310 B2 * | 5/2006 | Tsao | G06F 30/30 716/114 |
| 7,356,785 B2 * | 4/2008 | Lu | G01R 31/3016 716/114 |
| 7,411,425 B2 | 8/2008 | Belluomini et al. | |
| 7,418,641 B2 | 8/2008 | Drake et al. | |

(Continued)

OTHER PUBLICATIONS

Transmittal Form PTO/SB/21s signed Mar. 17, 2020.
(Continued)

*Primary Examiner* — Naum Levin
(74) *Attorney, Agent, or Firm* — Cantor Colburn LLP; William Kinnaman

(57) ABSTRACT

Methods, systems and computer program products for providing improved placement and connectivity of local clock buffer controllers are provided. Aspects include determining positions of a plurality of centroid locations within a circuit design based on positions of a plurality of latches within the circuit design. Aspects also include modifying the circuit design to place a local clock buffer controller at each of the plurality of centroid locations within the circuit design. Aspects also include connecting each of a plurality of local clock buffers within the circuit design to a nearest local clock buffer controller.

20 Claims, 11 Drawing Sheets

(56) References Cited

U.S. PATENT DOCUMENTS

| | | | |
|---|---|---|---|
| 7,549,137 B2* | 6/2009 | Alpert | G06F 30/392 716/114 |
| 7,551,985 B1 | 6/2009 | Chen et al. | |
| 7,598,774 B2 | 10/2009 | Belluomini et al. | |
| 7,624,366 B2* | 11/2009 | Alpert | G06F 30/392 716/119 |
| 7,653,884 B2* | 1/2010 | Furnish | G06F 30/392 716/103 |
| 7,685,552 B2* | 3/2010 | Ishihara | G06F 30/30 716/108 |
| 7,795,943 B2* | 9/2010 | Toyonoh | H01L 27/0207 327/295 |
| 7,917,880 B2* | 3/2011 | Mak | G06F 30/327 716/133 |
| 8,010,926 B2 | 8/2011 | Alpert et al. | |
| 8,104,014 B2* | 1/2012 | Puri | G06F 30/394 716/134 |
| 8,205,182 B1* | 6/2012 | Zlatanovici | G06F 30/327 716/125 |
| 8,490,039 B2 | 7/2013 | Agrawal et al. | |
| 8,495,552 B1 | 7/2013 | Cho et al. | |
| 8,661,374 B2* | 2/2014 | Vishweshwara | G06F 30/39 716/54 |
| 8,661,391 B1 | 2/2014 | Viswanath et al. | |
| 8,667,441 B2 | 3/2014 | Alpert et al. | |
| 8,677,299 B1 | 3/2014 | Alpert et al. | |
| 8,826,211 B1* | 9/2014 | Sood | G06F 30/394 716/113 |
| 8,832,626 B2 | 9/2014 | Agrawal et al. | |
| 8,904,255 B2 | 12/2014 | Tekumalla et al. | |
| 8,954,912 B2 | 2/2015 | Alpert et al. | |
| 8,966,425 B1* | 2/2015 | Eisenstadt | G06F 30/394 716/120 |
| 9,135,375 B1* | 9/2015 | Sood | G06F 30/00 |
| 9,411,912 B1* | 8/2016 | Sood | G06F 30/392 |
| 9,792,398 B2* | 10/2017 | Xu | G06F 30/34 |
| 10,417,375 B2 | 9/2019 | Chung et al. | |
| 2001/0010090 A1 | 7/2001 | Boyle et al. | |
| 2003/0135836 A1* | 7/2003 | Chang | G06F 30/30 716/119 |
| 2004/0230933 A1 | 11/2004 | Weaver et al. | |
| 2006/0041852 A1 | 2/2006 | Drumm et al. | |
| 2008/0148203 A1 | 6/2008 | Alpert et al. | |
| 2008/0168411 A1 | 7/2008 | Mang et al. | |
| 2008/0276212 A1 | 11/2008 | Albrecht | |
| 2010/0064264 A1 | 3/2010 | Amundson | |
| 2012/0124539 A1 | 5/2012 | Alpert et al. | |
| 2013/0326451 A1 | 12/2013 | Cho et al. | |
| 2014/0070847 A1 | 3/2014 | Elkin et al. | |
| 2014/0084890 A1 | 3/2014 | Philip | |
| 2016/0188774 A1 | 6/2016 | Adya et al. | |
| 2017/0323030 A1 | 11/2017 | Datta et al. | |

OTHER PUBLICATIONS

Held, S. et al., "Post-Routing Latch Optimization for Timing Closure," Research Institute for Discrete Mathematics, Bonn, Germany, 6 pages.

IBM "List of IBM Patents or Patent Applications Treated As Related; (Appendix P)", Filed Sep. 11, 2019, 2 pages.

Jesse Surprise et al., "Improved Clock Gating Latch Placement," U.S. Appl. No. 16/567,134, filed Sep. 11, 2019.

Jose Neves et al., "Multi-Fanout Latch Placement Optimization for Integrated Circuit (IC) Design," U.S. Appl. No. 16/567,050, filed Sep. 11, 2019.

Jose Neves et al., "Single-Bit Latch Optimization for Integrated Circuit (IC) Design," U.S. Appl. No. 16/567,031, filed Sep. 11, 2019.

Jose Neves et al., "Net Routing for Integrated Circuit (IC) Design," U.S. Appl. No. 16/567,035, filed Sep. 11, 2019.

Jung, J. et al., "Integrated Latch Placement and Cloning for Timing Optimization," ACM Transactions on Design Automation of Electronic Systems, Feb. 2019, vol. 24, No. 2, Article 22, 17 pages.

MacQueen et al., "Some Methods for classification and Analysis of Multivariate Observations," Proceedings of 5th Berkeley Symposium on Mathematical Statistics and Probability, University of California Press, 1967, pp. 281-297.

Papa, D. et al., "Physical Synthesis With Clock-Network Optimization for Large Systems on Chips," IEEE Computer Society, Jul./Aug. 2011, Big Chips, 12 pages.

Viswanathan, "Placement techniques for the physical synthesis of nanometer-scale integrated circuits," Iowa State University, Graduate Theses and Dissertations, 20758, 2009, 160 pages.

* cited by examiner

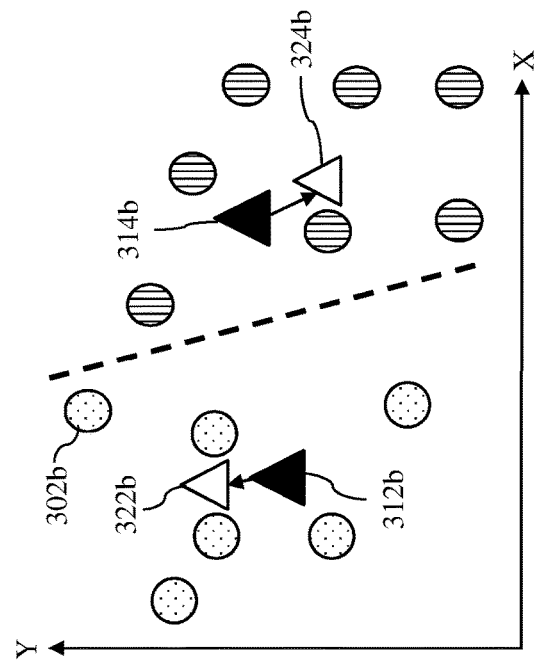
FIG. 3A
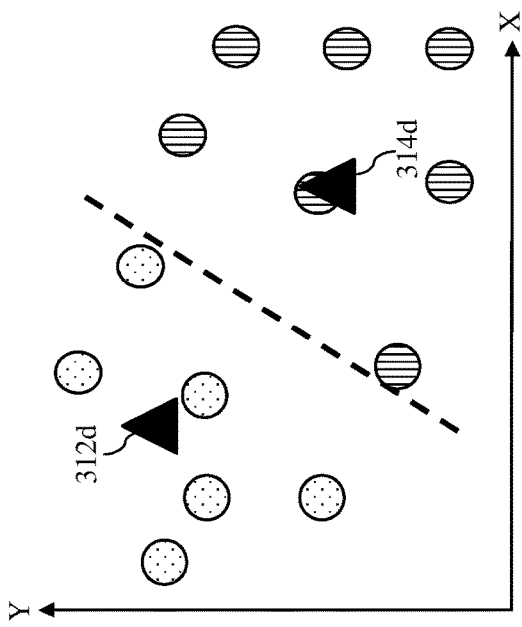
FIG. 3B
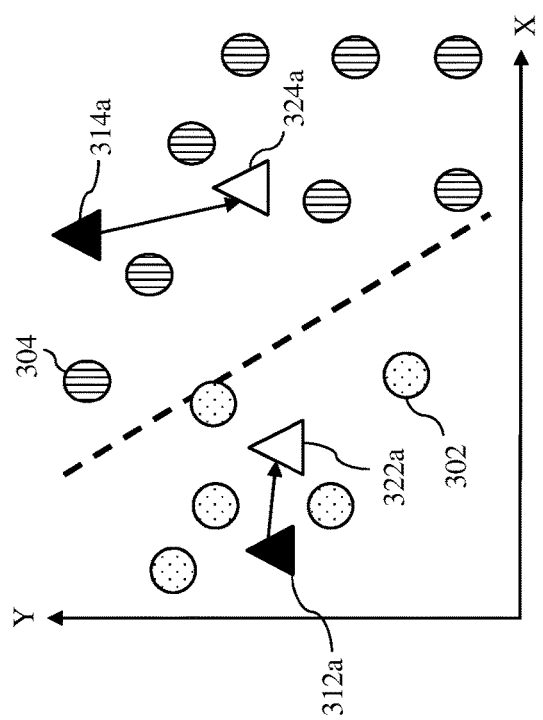
FIG. 3C
FIG. 3D

US 10,831,967 B1

LOCAL CLOCK BUFFER CONTROLLER PLACEMENT AND CONNECTIVITY

BACKGROUND

The present invention generally relates to the fabrication and design of semiconductor chips and integrated circuits, and more specifically, to the improved placement and connectivity of local clock buffer controllers.

A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. Cell placement in semiconductor fabrication involves a determination of where particular cells should optimally (or near-optimally) be located on an integrated circuit device. While various techniques provide adequate placement of cells with regard to their data interconnections, design consideration must also be given to constructing a clock network for the cells, which require a large amount of power. One method involves the use of local clock buffers (LCBs) to distribute the clock signals. Generally, a plurality of latches is controlled by a local clock buffer controller via one or more LCBs.

SUMMARY

Embodiments of the present invention are directed to providing improved placement and connectivity of local clock buffer controllers. A non-limiting example of the computer-implemented method includes determining positions of a plurality of centroid locations within a circuit design based on positions of a plurality of latches within the circuit design. The method also includes modifying the circuit design to place a local clock buffer controller at each of the plurality of centroid locations within the circuit design. The method also includes connecting each of a plurality of local clock buffers within the circuit design to a nearest local clock buffer controller.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3A depicts a first stage of determining centroid locations of latches using k-means clustering in accordance with one or more embodiments of the present invention;

FIG. 3B depicts a second stage of determining centroid locations of latches using k-means clustering in accordance with one or more embodiments of the present invention;

FIG. 3C depicts a third stage of determining centroid locations of latches using k-means clustering in accordance with one or more embodiments of the present invention;

FIG. 3D depicts a fourth stage of determining centroid locations of latches using k-means clustering in accordance with one or more embodiments of the present invention;

Figure 1:
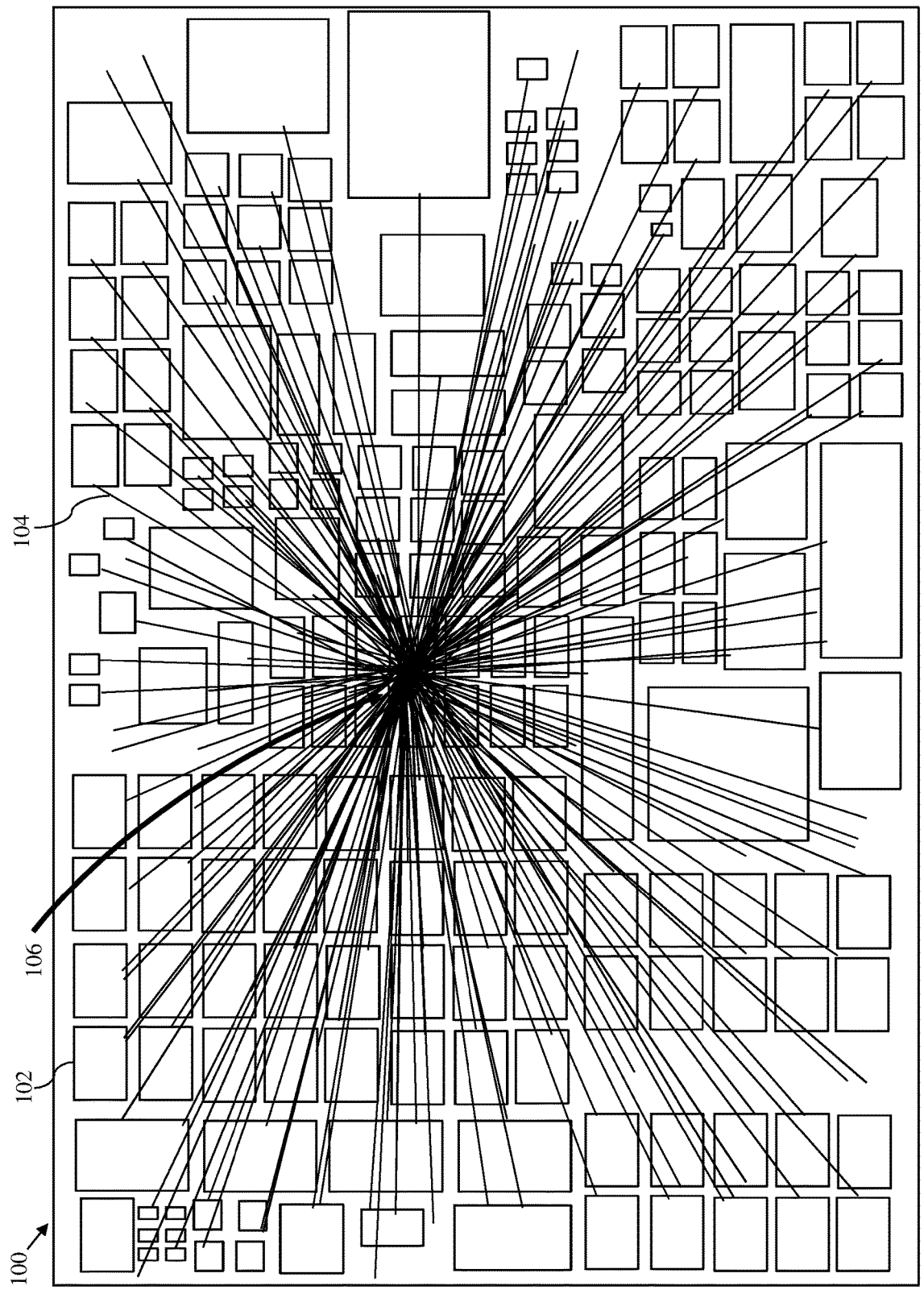
FIG. 1 depicts an example circuit design having centrally located local clock buffer controllers.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Integrated circuits are used for a wide variety of electronic applications, from simple devices such as wristwatches to the most complex computer systems. A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements grouped to perform a logic function. Cell types include, for example, core cells, scan cells and input/output (I/O) cells. Each of the cells of an IC may have one or more pins, each of which in turn may be connected to one or more other pins of the IC by wires. The wires connecting the pins of the IC are also formed on the semiconductor substrate. For more complex designs, there are typically at least four distinct layers of conducting media available for routing, such as a polysilicon layer and three metal layers (metal-1, metal-2, and metal-3). The polysilicon layer, metal-1, metal-2, and metal-3 are all used for vertical and/or horizontal routing.

An IC chip is fabricated by first conceiving the logical circuit description, and then converting that logical description into a physical description, or geometric layout. This process is usually carried out using a "netlist," which is a record of all of the nets, or interconnections, between the cell pins. A layout typically includes a set of planar geometric shapes in several layers. The layout is then checked to ensure that it meets all of the design requirements, particularly timing requirements. The result is a set of design files known as an intermediate form that describes the layout. The design files are then converted into pattern generator files that are used to produce patterns called masks by an optical or electron beam pattern generator. During fabrication, these masks are used to pattern a silicon wafer using a sequence of photolithographic steps. The process of converting the specifications of an electrical circuit into a layout is called the physical design.

Cell placement in semiconductor fabrication involves a determination of where particular cells should optimally (or near-optimally) be located on the surface of an integrated circuit device. Due to the large number of components and the details required by the fabrication process for very large scale integrated (VLSI) devices, physical design is not practical without the aid of computers. As a result, most phases of physical design extensively use computer-aided design (CAD) tools, and many phases have already been partially or fully automated. Automation of the physical design process has increased the level of integration, reduced turn around time and enhanced chip performance. Several different programming languages have been created for electronic design automation (EDA) including Verilog, very high speed integrated circuit hardware description language (VHDL) and time division multiplexing logic (TDML). A typical EDA system receives one or more high level behavioral descriptions of an IC device, and translates this high level design language description into netlists of various levels of abstraction.

While various techniques provide adequate placement of cells with regard to their data interconnections, there is an additional challenge for the designer in constructing a clock network for the cells, which requires a large amount of power. There are several techniques for minimizing power while still achieving timing objectives for high performance, low power systems. One method involves the use of local clock buffers (LCBs) to distribute the clock signals. A typical clock control system has a clock generation circuit (e.g., a phase-lock loop) that generates a master clock signal which is fed to a clock distribution network that renders synchronized global clock signals at the LCBs. Each LCB adjusts the global clock duty cycle and edges to meet the requirements of respective circuit elements, e.g., local logic circuits or latches (the term "latch" as used herein stands for any clocked element which is usually a sink of a clock distribution network). Since this clock network is one of the largest power consumers among all of the interconnects, it is further beneficial to control the capacitive load of the LCBs, each of which is driving a set of many clock sinks. One approach for reducing the capacitive load is latch clustering, i.e., clusters of latches placed near the respective LCB of their clock domain. Latch clustering combined with LCBs can significantly reduce the total clock wire capacitance which in turn reduces overall clock power consumption. Since most of the latches are placed close to an LCB, clock skew is also reduced which helps improve the timing of the circuit.

Turning now to an overview of technologies that are more specifically relevant to aspects of the invention, LCBs and their connected latches are typically controlled upstream by local clock buffer control circuitry (each instance of which may be referred to as a "local clock buffer controller"). As will be appreciated by those of skill in the art, a local clock buffer controller can be a sub-circuit that is configured to control up to a maximum number of latches via one or more LCBs. For example, in some embodiments, a local clock buffer controller can be made up of a delay clock circuit, a clock gating circuit, or a pulse width generation circuit. A local clock buffer controller may theoretically control an unlimited number of LCBs, however it may ultimately control only up to a maximum number of latches connected to the LCBs (e.g., 200 latches), therefore, a given circuit design may include a large number of local clock buffer controllers to control all of the latches in the circuit design. Although various instances of local clock buffer controllers may be standardized sub-circuits (i.e., identical or approximately identical), there can be different types of local clock buffer controllers that each have a different design. For example, the type of the local clock buffer controller can be based on the domain (e.g., functional clock domain vs. test clock domain) of the local clock buffer controller. As will be appreciated by those of skill in the art, there can be multiple functional and/or test domains and in some embodiments, the type of local clock buffer controller can be based on an instance of a particular type of domain. Historically, latches were placed in a manner in which they were pre-clumped together around their own set of local clock buffer controls. However, more modern latch placement methods involve placing the latches at the top level of the design such that they are now free floating and the latches that are controlled by a given local clock buffer controller are conventionally assigned by a method that is not physically aware, which can result in an undesirable excess of wiring required to connect the local clock buffer controllers to the LCBs that control the latches. Such excess wiring can increase the complexity of a circuit design and generate timing issues that can negatively impact circuit performance.

Turning now to an overview of the aspects of the invention, one or more embodiments of the invention address one or more of the above-described shortcomings of the prior art by disclosing methods and techniques for providing improved placement of local clock buffer controllers within a circuit design to reduce the overall amount of wiring needed. Embodiments of the invention can utilize an algorithm, such as a k-means clustering algorithm, to distribute the placement of local clock buffer controllers within a circuit design in a more decentralized fashion and then reconnect the latches to the nearest local clock buffer controller via a connected LCB. It should be understood that latches are connected to a local clock buffer controller via an LCB (i.e., a local clock buffer controller connects to one or more LCBs which each connect to a group of latches), so references to connecting or reconnecting the latches to the local clock buffer controller can mean connecting/reconnecting an LCB that is connected to a group of latches to the local clock buffer controller. According to some embodiments, the algorithm may determine the centroid positions of a plurality of clusters of latches and place a local clock buffer controller at each of the determined centroid positions prior to reconnecting the latches. The centroid positions can be determined by an iterative process of reclustering the latches and adjusting the positions of centroids based on the new clusters until the clusters and centroid positions are fixed. The local clock buffer controllers can be placed at the determined centroid positions and can be reconnected to the latches (e.g., via LCBs) of the cluster of latches associated with the centroid position as determined by the iterative reclustering process. In this way, the techniques disclosed herein can provide for the improved placement of local clock buffer controls within a circuit design in a manner that allows for a significant reduction in overall net (i.e., wiring) length of the design.

Turning now to a more detailed description of aspects of the present invention, FIG. 1 depicts a top view of an example circuit diagram 100 (which may also be referred to as a "circuit design") of an integrated circuit having various circuit elements 102 (represented by the various boxes). As will be understood by those of skill in the art, each circuit element 102 can be a modular sub-circuit of the circuit design. Although not depicted due to their relatively small size, it should be understood that a typical circuit design may include thousand or even millions of latches that are each to be connected to one of a plurality of a local clock buffer controllers (via LCBs). Such connections are represented by the plurality of nets 104 shown in FIG. 1. According to some embodiments, each net 104 can represent a connection between a latch and a local clock buffer controller (via an LCB). For the ease of representation, the LCBs have been omitted from FIG. 1, but it will be understood that each latch connects to a local clock buffer controller via an LCB, and the nets 104 shown in FIG. 1 is intended to provide an approximation of the lengths of nets that would be required to connect the latches to the LCBs to the local clock buffer controllers, based on the positions of the local clock buffer controllers within the circuit diagram 100. It will be understood that the example circuit diagram 100 shown in FIG. 1 is for illustrative purposes and may only include a limited number of latches/nets, whereas in practice a circuit design may include many more latches/nets. In the example shown in FIG. 1, a plurality of local clock buffer controllers 106 are positioned at the center of the circuit diagram 100, which can cause the overall net length to be high due to the distribution of latches throughout the entire area of the circuit design. The high overall net length of a circuit design such as that shown in FIG. 1 can be improved upon using the techniques disclosed herein.

Figure 2:
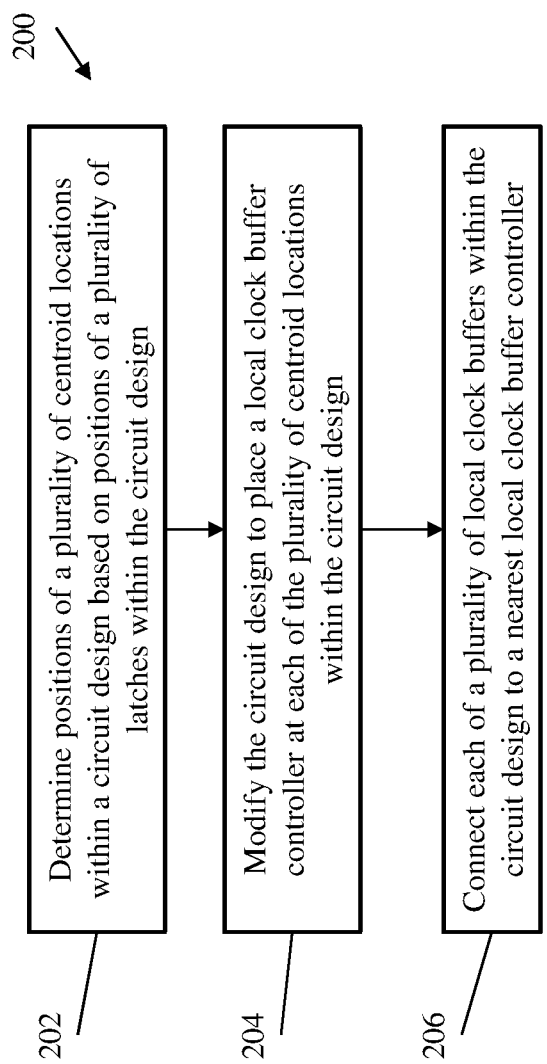
FIG. 2 illustrates a flow diagram of a process for providing improved placement and connectivity of local clock buffer controllers in accordance with one or more embodiments of the present invention.

Turning now to FIG. 2, a flow diagram of a method 200 for providing improved placement of local clock buffer controllers in accordance with an embodiment is shown. In one or more embodiments of the present invention, the method 200 may be embodied in software that is executed by computer elements of computer 700 illustrated in FIG. 7, or by computer elements located within a network that may reside in the cloud, such as the cloud computing environment 50 described herein above and illustrated in FIGS. 9 and 10. In other embodiments, the computer elements may reside on a computer system or processing system, such as the processing system 1100 described herein above and illustrated in FIG. 11, or in some other type of computing or processing environment.

The method 200 begins at block 202 and includes determining (e.g., via computer 700) positions of a plurality of centroid locations within a circuit design based on positions of a plurality of latches within a circuit design. A centroid location can refer to the position of a centroid of a group of latches within a 2-dimensional plane (e.g., such as the 2-dimensional plane of example circuit diagram 100 as shown in FIG. 1) of the circuit diagram. According to some embodiments, the plurality of centroid locations can be a number of centroid locations that is determined by dividing a total number of latches of the plurality of latches by a maximum latch capacity of a local clock buffer controller. For example, if the maximum latch capacity of a local clock buffer controller is 200 and there are 1,000 latches, then the number of centroids will be 5 and the method will involve determining the positions of 5 centroid locations. According to some embodiments, a local clock buffer controller can be an edge triggered pulse generator. According to some embodiments, a local clock buffer controller can include a delay clock circuit, a clock gating circuit, or a pulse width generation circuit.

According to some embodiments, the positions of the plurality of centroid locations within the circuit design can be determined using a k-means clustering algorithm as illustrated by the examples shown in FIGS. 3A-D. In some embodiments, using a k-means clustering algorithm can include placing each of the plurality of centroid locations at a respective initial position, determining initial latch clusters based on the respective initial positions of the plurality of centroid locations and the positions of the plurality of latches within the circuit design, and for the plurality of centroid locations, determining respective final latch clusters and respective final positions of the centroid locations by an iterative process. In some embodiments, the initial positions of each of the plurality of centroid locations can be a random position within the circuit diagram. Each initial latch cluster can be a unique subset of the plurality of latches that are associated with a unique one of the plurality of centroid locations. In other words, all of the latches included in the circuit diagram can be grouped into clusters such that each individual latch is only in one cluster. According to some embodiments, the number of clusters can correspond to the number of centroid locations such that each cluster is associated with a particular centroid location of the plurality of centroid locations. In some embodiments, determining initial latch clusters (i.e., identifying which latches are members of which clusters) can include determining a nearest initial centroid location for each latch of the plurality of latches and grouping the plurality of latches into a plurality of initial latch clusters. Each of the plurality of initial latch clusters can be a subset of latches of the plurality of latches that have a same nearest initial centroid location.

The determination of initial latch clusters can be illustratively shown by FIG. 3A, which depicts a 2-dimensional space (X-Y plane) that can be representative of an area within a circuit design that includes a plurality of latches (represented by circles). The plurality of latches shown have been clustered into a first cluster of latches 302 associated with a first centroid 312a and a second cluster of latches 304 associated with a second centroid 314a. According to some embodiments, the centroids 312a, 314a may be initially placed at random locations within the circuit diagram. A k-means clustering algorithm may determine which latches belong to each initial cluster by determining which centroid 312a, 314a is closest to each latch and assigning each latch to a cluster based on the closest centroid. Thus, the system can determine that each of a first set of latches 302 (represented as having a polka dot design) is closest to the first centroid 312a and that each of a second set of latches 304 (represented as having a striped design) is closest to the second centroid 314a and can thus form a first cluster of latches 302 associated with the first centroid 312a and a second cluster of latches 304 associated with the second centroid 314a.

According to some embodiments, the iterative process used to determine final latch clusters and respective final positions of the centroid locations can include adjusting positions of the centroid locations based on positions of latches of associated latch clusters and determining new latch clusters based on the adjusted positions of the centroid locations and the positions of the plurality of latches within the circuit design. Each new latch cluster can be a unique subset of the plurality of latches that are associated with a unique one of the plurality of centroid locations. For example, if there are initially 5 clusters of 200 latches each, upon being reclustered there will still be 5 clusters of 200 latches each, but the individual latches that make up the group of 200 latches of a given cluster may be different than the initial individual latches that made up the 200 latches. In other words, as reclustering occurs, latches may shift from one cluster to another and consequently a given latch may change from being associated with one centroid location to being associated with a different centroid location. As shown in FIGS. 3A, 3B and 3C, in some embodiments, adjusting positions of the centroid locations based on positions of latches of associated latch clusters can include, for each centroid location: determining a new position that corresponds to the mean of the positions of the latches of the associated latch cluster and moving the position of the centroid location to the new position. For example, as shown in FIG. 3A, a new centroid location 322a of the first centroid 312a can be determined by determining the mean position of all of the latches 302 in the first cluster and likewise a new centroid location 324a of the second centroid 314a can be determined by determining the mean position of all of the latches 304 in the second cluster. According to some embodiments, the mean position of a cluster of latches can be determined by calculating an average of all of the X coordinates of the latches in the cluster to determine a mean X value and the average of all of the Y coordinates of the latches in the cluster to determine a mean Y value. The calculated mean X value and the mean Y value will be the coordinates of the mean position of the cluster of latches. The system can move the first and second centroids 312a, 314a to the respective new centroid locations 322a, 324a and then perform a reclustering. For example, as shown in FIG. 3B, the first centroid 312b and the second centroid 314b having been placed at the respective new centroid locations 322a, 324a determined in FIG. 3A, the system can now determine what the closest centroid is for each latch and form new clusters accordingly. Thus, as shown in FIG. 3B, a first latch 302b that was previously in the second cluster (i.e., as shown in FIG. 3A) is now closest to the first centroid 312b and is thus now placed in the first cluster. The process repeats and based on the new clusters, a new set of new centroid locations 322b, 324b are determined for each cluster by determining the mean position of the latches within each respective cluster. FIG. 3C shows the next stage or iteration of this process, where it can be seen that based on the new locations of the first centroid 312c and the second centroid 314c, a second latch 302c has been removed from the second cluster and has been added to the first cluster, and a third latch 304c has been removed from the first cluster and added to the second cluster. Based on these new clusters, a new set of new centroid locations 322c, 324c for the first and second centroids 312c, 314c can be determined by again determining the mean position of all of the latches 302 in the first cluster and the mean position of all of the latches 304 in the second cluster respectively.

According to some embodiments, the respective final positions of the centroid locations can be determined in response to determining that, for each of the centroid locations, the new position is identical to an immediately preceding position of the centroid location. For example, as shown in FIG. 3C, the first centroid 312c can be moved to a new centroid location 322c and the second centroid 314c can be moved to a new centroid location 324c prior to the next iteration of reclustering. However, as shown in FIG. 3D, when the system attempts to recluster the latches again, the clusters are stable (i.e., no latch switches from one cluster to another) because each latch is now in a cluster that is associated with the closest centroid location. As there is no change in the members of each cluster, the positions the first and second centroids 312d, 314d will not change and thus the first and second centroids 312d, 3124d can be considered to have found their final locations as a result of the iterative process described above. Although the example of the k-means clustering algorithm shown in FIGS. 3A-3D only depicts two centroid locations and two clusters, it will be understood that this algorithm may be applied to any number of centroid locations and corresponding clusters. Further, although use of a k-means clustering algorithm to determine the final positions of the centroid locations is described herein, it should also be understood that in various embodiments other algorithms for determining the positions of the centroid locations and/or local clock buffer controllers may be used. For example, in some embodiments, an algorithm for determining positions of the lock clock buffer controllers may include generating a grid across the circuit design and positioning local clock buffer controllers at one or more points of intersection of the grid (e.g., placing the local clock buffer controllers at standard intervals across the horizontal and/or vertical dimensions of the circuit design). According to some embodiments, an algorithm for determining the positions of the centroid location can include weighting the centroid location to bias towards reducing some other metric, such as for example, skew or minimal pulse width fluctuation.

As shown at block 204, the method includes modifying (e.g., via computer 700) the circuit design to place a local clock buffer controller at each of the plurality of centroid locations within the circuit design. For example, the circuit design may be embodied in a digital file and placing the local clock buffer controllers at the centroid locations can include modifying the digital file to reflect the inclusion of the local clock buffer controllers at those locations within the circuit design.

According to some embodiments, modifying the circuit design to place a local clock buffer controller at each of the plurality of centroid locations within the circuit design can include, for each of the plurality of centroid locations within the circuit design: modifying the circuit design to place a local clock buffer controller in an area of the circuit design that corresponds to the centroid location in response to determining that the area of the circuit design is empty and/or modifying the circuit design to place a local clock buffer controller in an empty area that is adjacent to the area of the circuit design in response to determining that the area of the circuit design that corresponds to the centroid location is occupied by another circuit element. In other words, if the area within the circuit design that is covered by a given centroid location does not already include some circuit element that occupies the space, then a local clock buffer controller can be placed there, but if the space is already occupied by another circuit element, then the system may place the local clock buffer controller in an empty area that is the closest to the centroid location.

As shown at block 206, the method includes connecting (e.g., via computer 700) each of a plurality of local clock buffers within the circuit design to a nearest local clock buffer controller. In some embodiments, the plurality of local clock buffers that are connected to a given local clock buffer controller are the local clock buffers that connect to the plurality of latches that make up the cluster of latches that is associated with the given local clock buffer controller. In other words, each cluster of latches can be connected to a respective local clock buffer controller via one or more local clock buffers.

According to some embodiments, various of the local clock buffer controllers, local clock buffers and latches may be associated with different domains. For example, some local clock buffer controllers and latches may be in the functional clock domain and others may be in the test clock domain. Thus, in some embodiments, connecting each of a plurality of local clock buffers within the circuit design to a nearest local clock buffer controller can include, for each local clock buffer: identifying a domain associated with the local clock buffer and connecting the local clock buffer to a closest local clock buffer controller that is associated with the same domain as the local clock buffer. According to some embodiments, latches that are in different domains can be separately clustered in relation to separate centroid locations from others. In other words, in some embodiments, where there are different sets of latches in different domains, the method 200 may be applied to each set of latches independently and in parallel such that the locations of a first type of latch do not affect the centroid locations associated with a second type of latch and vice versa.

Figure 4:
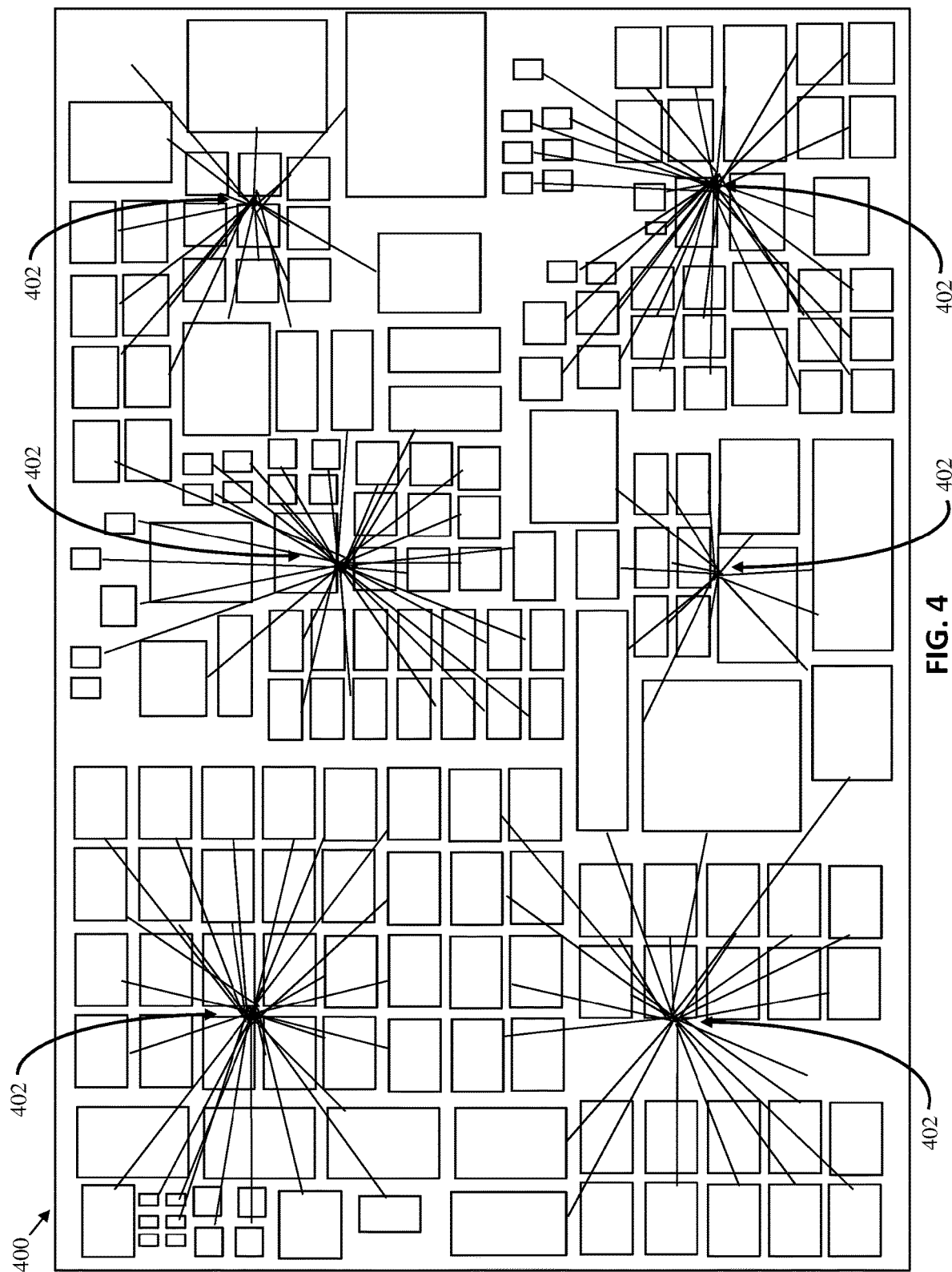
FIG. 4 depicts an example circuit design having local clock buffer controllers with improved placements and connectivity in accordance with one or more embodiments of the present invention.
Figure 5:
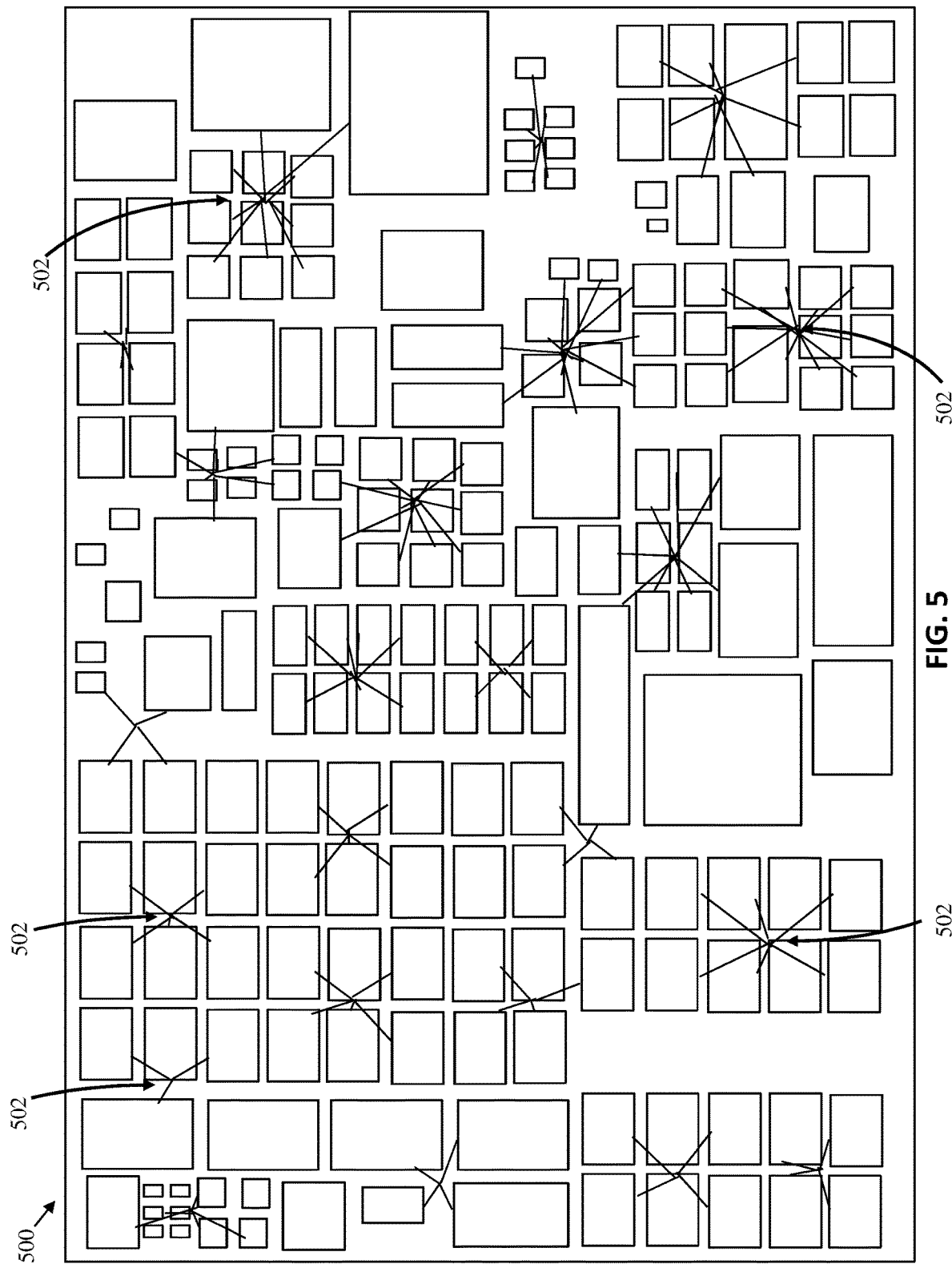
FIG. 5 depicts another example circuit design having local clock buffer controllers with improved placements and connectivity in accordance with one or more embodiments of the present invention.

FIG. 4 depicts an example circuit design 400 that may result following the application of method 200 to place various local clock buffer controllers 402 about the circuit design 400. When compared to FIG. 1 in which the local clock buffer controllers 106 are concentrated at the center of the circuit design 100, it can be seen that distributing the placement of the local clock buffer controllers 106 in this way can greatly reduce the overall length of nets needed to connect to the latches (via local clock buffers). FIG. 5 depicts another example circuit design 500 that may result following the application of method 200 but in a case where the circuit design includes many more local clock buffer controllers 502 than the example shown in FIG. 4. As shown in FIG. 5, when a greater granularity of the distribution of local clock buffer controllers 502 is achieved, the overall reduction in net length can be even greater, resulting in less complex design that can have better timing characteristics. In the interest of providing a simple approximation of the effect of the positions of the local clock buffer controllers on the aggregate length of the nets (i.e., wires) within the circuit design, the LCBs (and the nets between them and the latches) are not shown in FIGS. 1, 4 and 5, however it should be understood that each local clock buffer controller is configured to connect to one or more LCBs, which in turn each connect to a plurality of the latches.

Figure 6:
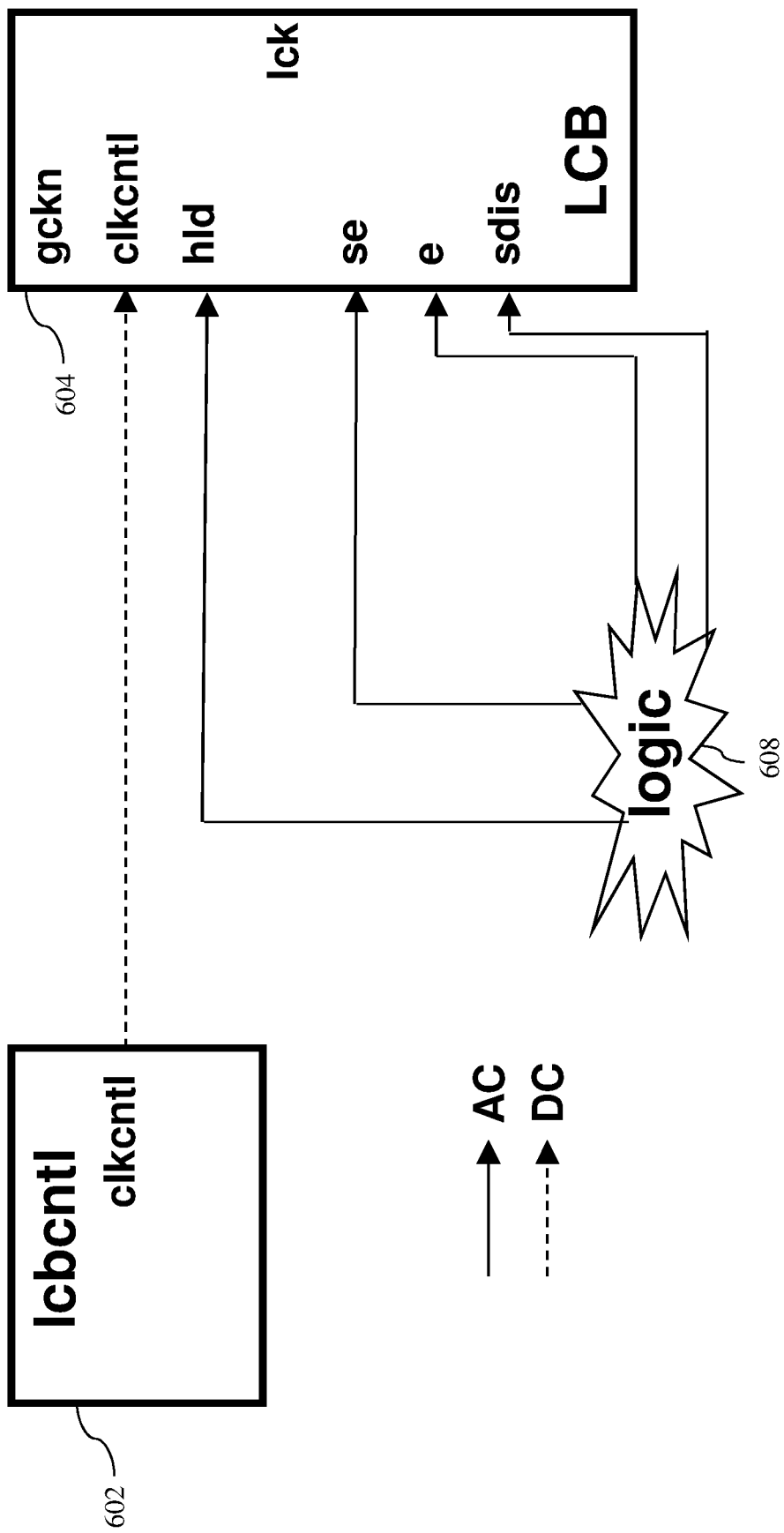
FIG. 6 depicts an example block diagram of connections between a local clock buffer controller and a local clock buffer in accordance with one or more embodiments of the present invention.

FIG. 6 depicts an example block diagram of connections between a local clock buffer controller 602 and a local clock buffer (LCB) 604 in accordance with one or more embodiments of the present invention. According to some embodiments, the local clock buffer 602 may pass one or more signals (e.g., clkcntl or clock control signals) directly to the LCB 604. As shown in FIG. 6, according to some embodiments, an LCB 604 may receive as inputs, a global clock input signal ("gckn"), a clock control signal ("clkcntl"), a phase hold signal ("hld"), a scan enable signal ("se"), an enable or clock gate enable signal ("e"), and a scan disable signal ("sdis"), and can output a local clock output signal ("lck") to latches. As shown in FIG. 6, various signals can be alternating current ("AC") signals, while other signal can be direct current ("DC") signals. The LCB 604 may also receive signals from logic elements 608 at inputs. According to some embodiments, logic elements 608 can include logic to control the scanning of the design for test and functional modes as well as logic to turn on/off the clocks to the set of latches driven by the LCB. Although not shown in FIG. 6, the LCB may output signals to a plurality of latches (i.e., the latches in a cluster that is associated with the local clock buffer controller 602). Following placement of the local clock buffer controllers in a circuit diagram as discussed above, the system may connect each local clock buffer controller 602 to one or more LCB's 604 that are connected to the latches of the associated latch cluster in a manner such as that shown in FIG. 6, or any other such suitable manner known in the art. According to some embodiments, connecting the local clock buffer controller 602 to the LCB 604 can include modifying connections listed in a netlist that provides pin connections between circuit elements to reflect the appropriate input and output connections between the elements. A netlist can be stored as part of an electronic file that includes the circuit diagram and which may be used to generate a physical integrated circuit as described below with respect to FIG. 7. Embodiments of the disclosed invention include connection the local clock buffer controller 602 to one or more LCB 604s (that are in turn connected to one or more latch clusters), however this connecting of the local clock buffer controller 602 to LCB(s) 604 can be considered to be a step of reconnecting the local clock buffer controllers 602, as there may have been a different initial set of connections reflected by the net list prior to repositioning the local clock buffer controller(s) 602. According to some embodiments, the step of connecting (or reconnecting) the local clock buffer controller(s) 602 to one or more LCBs 604 can result in the reduction of the overall net length and signal congestion, for example as represented by the difference shown between FIG. 1 and either of FIGS. 4 and 5. According to some embodiments, following the connection (or reconnection) of the local clock buffer controller(s) 602 to the LCBs 604, the system may perform a check to verify that the circuit design matches the intent behind the logic, as the circuit design may no longer directly map back to the original logic.

Figure 7:
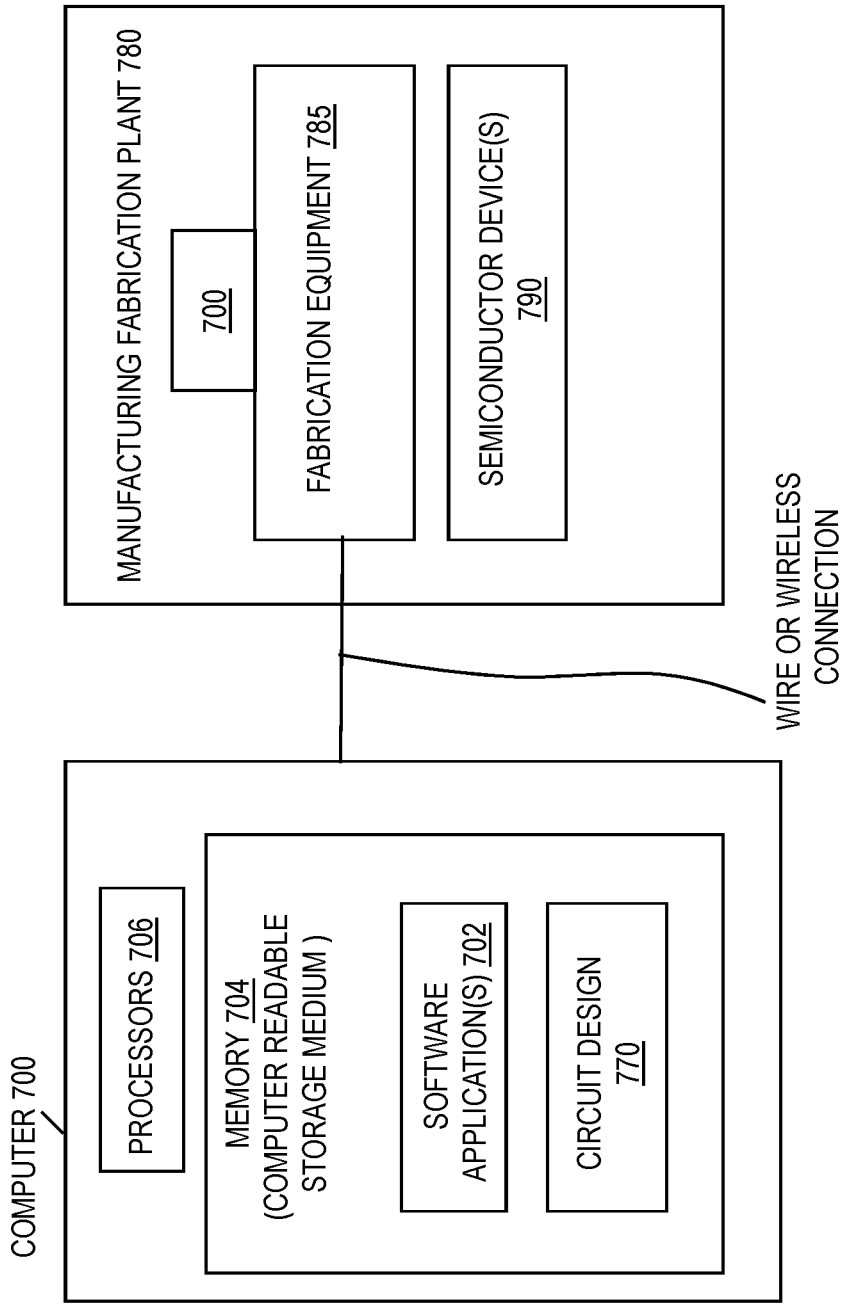
FIG. 7 depicts a system of a computer system integrated with a manufacturing fabrication plant according to one or more embodiments of the invention.

According to some embodiments, a circuit design such as the circuit design 500 shown in FIG. 5 can be generated using the computer system 700 shown in FIG. 7. Although the circuit design 500 shown in FIG. 5 depicts the circuit design 500 at a high level of abstraction, those of skill in the art will recognize that the various circuit elements (such as circuit elements 102 shown in FIG. 1) of the circuit design 500 provide a useful layer of hierarchical abstraction for designing an integrated circuit that may contain billions of transistors. The computer system 700 has one or more software applications 702 configured to function and implement operations as discussed herein. For example, software applications 702 may include a local clock buffer controller placement routine that includes sub-routines for iteratively clustering and adjusting the positions of centroid locations to determine final latch clusters and local clock buffer controller positions as described previously above. According to some embodiments, software applications 702 can provide other routines, such as a place and fill routines for placing functional cells and fill cells in order to complete a semiconductor layout that may be included as an aspect of the circuit design. A circuit design can be constructed by the software application 702 of the computer 700 to build the semiconductor device (e.g., an integrated circuit).

The software applications 702 include, integrate, are coupled to, and/or function as electronic design automation (EDA), also referred to as electronic computer-aided design (ECAD). Electronic design automation is a category of software tools for designing electronic systems such as integrated circuits and printed circuit boards. The tools work together in a design flow that chip designers use to design and analyze entire semiconductor chips. In some implementations, the computer 700 is coupled to, integrated with, and/or part of the fabrication equipment 785 at the manufacturing fabrication plant 780 (so as to communicate with and/or control operations of the fabrication equipment 785) to thereby fabricate semiconductor device(s) 790 as depicted in FIG. 7, as understood by one skilled in the art. The computer 700 includes one or processors 706 configured to execute one or more software applications 702 in memory 704. The computer 700 receives input of a design 770 (e.g., such as a circuit design 500) for the semiconductor device 790, and the computer 700 is configured to develop/form a semiconductor layout for the semiconductor device in order to build the semiconductor device. A semiconductor layout is a physical design released to the manufacturing fabrication (Fab) plant 780 and physically fabricated by the fabrication equipment 785 to produce the semiconductor device 790. The manufacturing fabrication plant 780 builds the photo mask from the semiconductor layout as a physical design, and then builds the actual product using the photo mask. The product is an integrated circuit (i.e., semiconductor device 790) on a wafer according to the semiconductor layout (physical design). There may be numerous integrated circuits on a wafer, and each integrated circuit may be diced into an individual chip.

Figure 8:
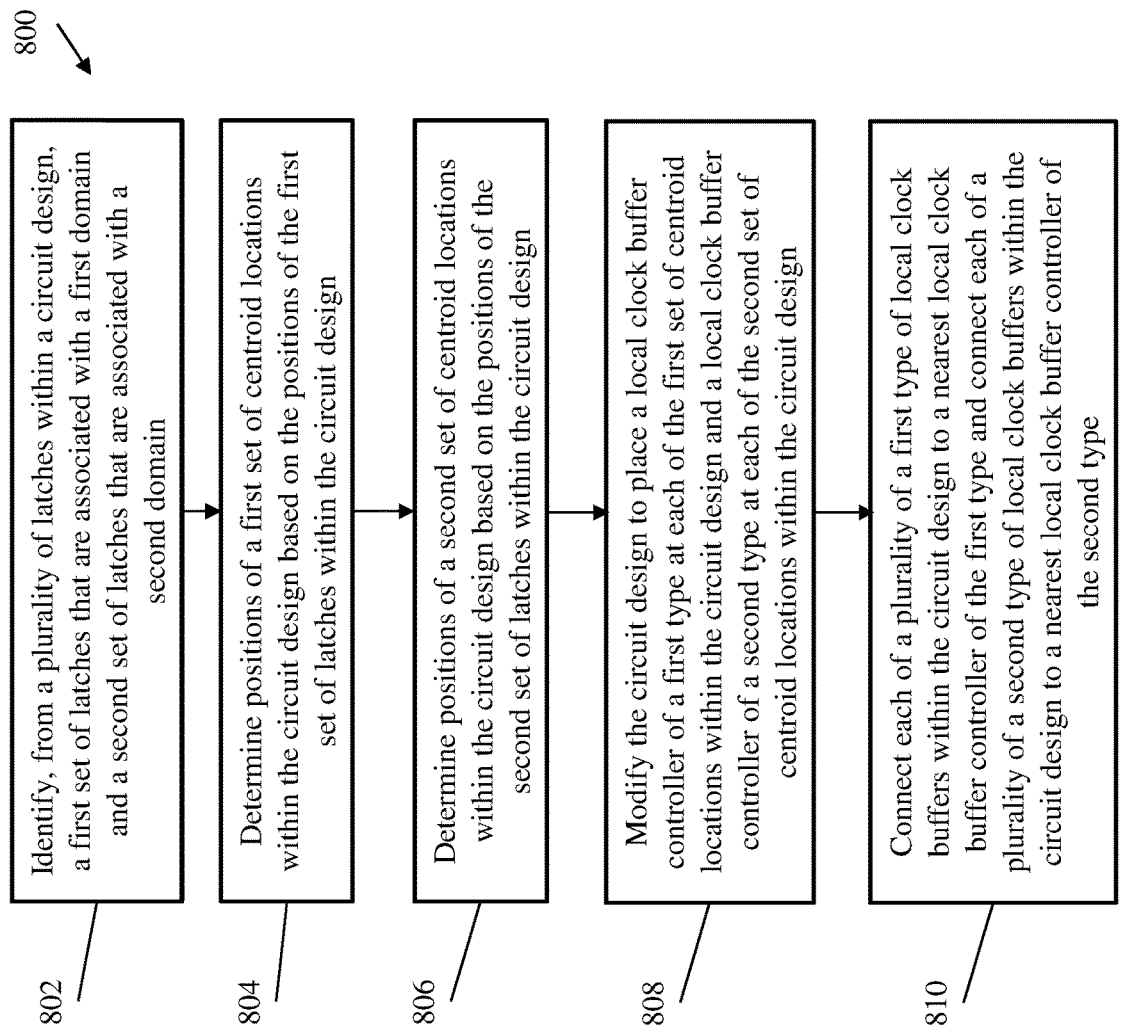
FIG. 8 illustrates a flow diagram of another process for providing improved placement and connectivity of local clock buffer controllers in accordance with one or more embodiments of the present invention.

Turning now to FIG. 8, a flow diagram of a method 800 for providing improved placement of local clock buffer controllers in accordance with an embodiment is shown. In one or more embodiments of the present invention, the method 800 may be embodied in software that is executed by computer elements of computer 700 illustrated in FIG. 7, or by computer elements located within a network that may reside in the cloud, such as the cloud computing environment 50 described herein above and illustrated in FIGS. 9 and 10. In other embodiments, the computer elements may reside on a computer system or processing system, such as the processing system 1100 described herein above and illustrated in FIG. 11, or in some other type of computing or processing environment.

The method 800 begins at block 802 and includes identifying (e.g. via computer 700), from a plurality of latches within a circuit design, a first set of latches that are associated with a first domain and a second set of latches that are associated with a second domain. For example, the first domain may be the functional clock domain and the second domain may be the test clock domain.

As shown at block 804, the method includes determining (e.g. via computer 700) positions of a first set of centroid locations within the circuit design based on the positions of the first set of latches within the circuit design, for example in a manner similar to that described above with respect to block 202.

As shown at block 806, the method includes determining (e.g. via computer 700) positions of a second set of centroid locations within the circuit design based on the positions of the second set of latches within the circuit design, for example in a manner similar to that described above with respect to block 202.

As shown at block 808, the method includes modifying (e.g. via computer 700) the circuit design to place a local clock buffer controller of a first type at each of the first set of centroid locations within the circuit design and a local clock buffer controller of a second type at each of the second set of centroid locations within the circuit design, for example in a manner similar to that described above with respect to block 204.

As shown at block 810, the method includes connecting (e.g. via computer 700) each of a plurality of a first type of local clock buffers within the circuit design to a nearest local clock buffer controller of the first type and connecting each of a plurality of a second type of local clock buffers within the circuit design to a nearest local clock buffer controller of the second type, for example in a manner similar to that described above with respect to block 206.

Additional processes may also be included. It should be understood that the processes depicted in FIGS. 2 and 8 represent illustrations, and that other processes may be added or existing processes may be removed, modified, or rearranged without departing from the scope and spirit of the present disclosure.

Figure 9:
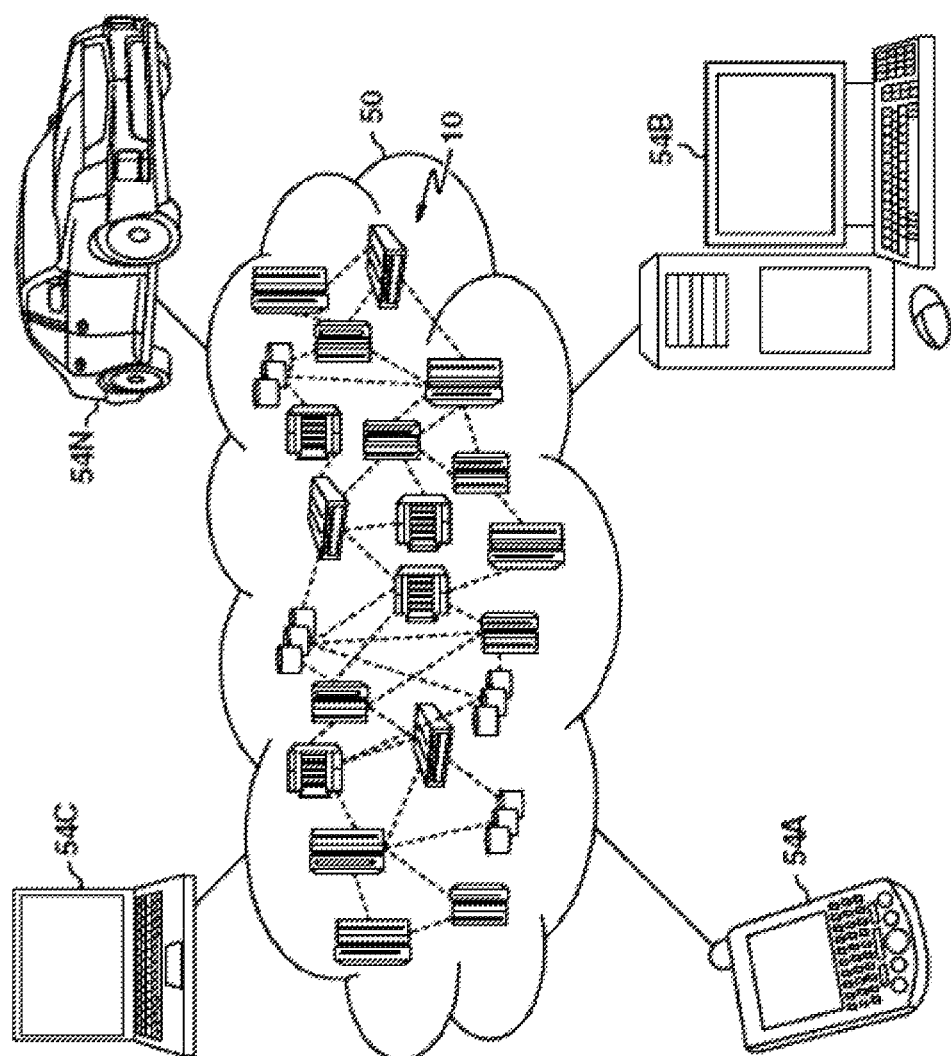
FIG. 9 illustrates a cloud computing environment according to one or more embodiments of the present invention.
Figure 10:
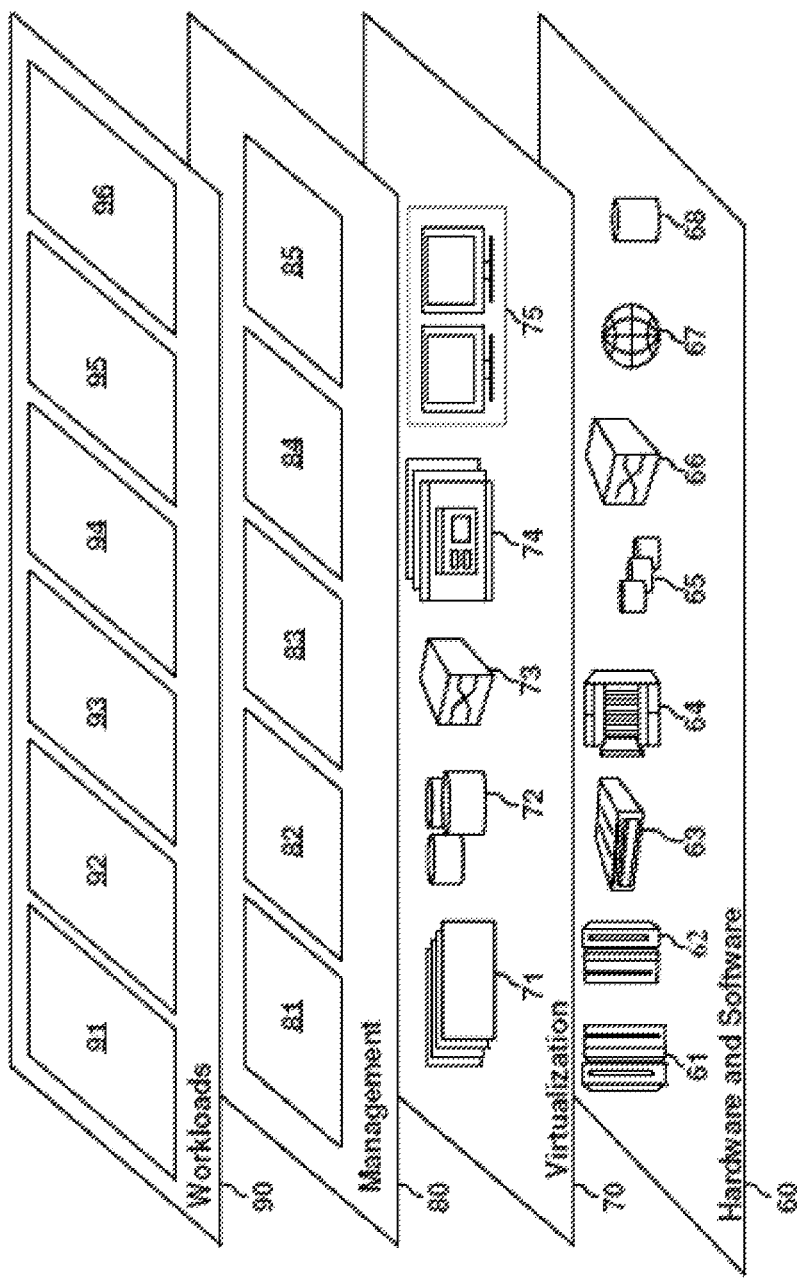
FIG. 10 illustrates abstraction model layers according to one or more embodiments of the present invention.

FIG. 9 depicts a cloud computing environment according to one or more embodiments of the present invention. FIG. 10 depicts abstraction model layers according to one or more embodiments of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing improved placement of local clock buffer controllers 96.

Figure 11:
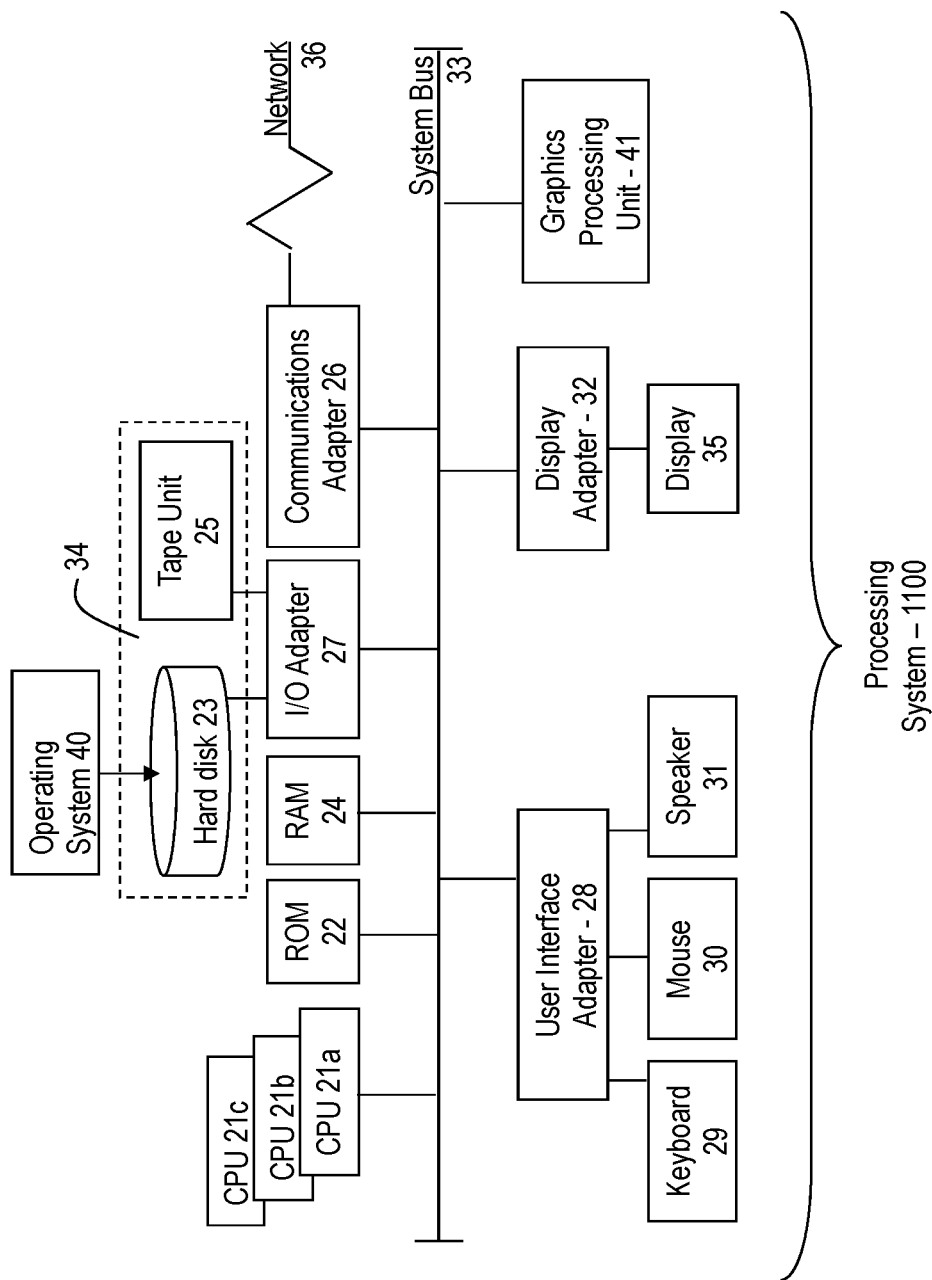
FIG. 11 illustrates a block diagram of a computer system for use in implementing one or more embodiments of the present invention.

FIG. 11 depicts a processing system for implementing one or more embodiments of the present invention. It is understood that one or more embodiments of the present invention are capable of being implemented in conjunction with any other type of computing environment now known or later developed. For example, FIG. 11 depicts a block diagram of a processing system 1100 for implementing the techniques described herein. In accordance with one or more embodiments of the present invention, computer 700 and/or system 1100 can be an example of a cloud computing node 10 in FIG. 9. In the embodiment shown in FIG. 11, processing system 1100 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 1100.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 1100 can be stored in mass storage 34. The RAM 24, ROM 22, and mass storage 34 are examples of memory 19 of the processing system 1100. A network adapter 26 interconnects system bus 33 with an outside network 36 enabling the processing system 1100 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 1100 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 1100 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 1100.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of 8% or 5%, or 2% of a given value.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilizes a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   identifying, from a plurality of latches within a circuit design, a first set of latches associated with a first domain and second set of latches associated with a second domain;
   determining, based on positions of the first set of latches within the circuit design, positions of a first set of centroid locations within the circuit design;
   determining, based on positions of the second set of latches within the circuit design, positions of a second set of centroid locations within the circuit design;
   modifying the circuit design to place a local clock buffer controller of a first type at each of the first set of centroid locations within the circuit design and a local clock buffer controller of a second type at each of the second set of centroid locations within the circuit design; and
   connecting each of a plurality of local clock buffers within the circuit design to a nearest local clock buffer controller of a same type.

2. The computer-implemented method of claim 1, wherein the plurality of centroid locations comprises a number of centroid locations that is determined by dividing a total number of latches of the plurality of latches by a maximum latch capacity of a local clock buffer controller.

3. The computer-implemented method of claim 1, wherein the positions of the plurality of centroid locations within the circuit design are determined using a k-means clustering algorithm.

4. The computer-implemented method of claim 3, wherein using a k-means clustering algorithm comprises:
  placing each of the plurality of centroid locations at a respective initial position;
  determining, based on the respective initial positions of the plurality of centroid locations and the positions of the plurality of latches within the circuit design, initial latch clusters, wherein each initial latch cluster comprises a unique subset of the plurality of latches that are associated with a unique one of the plurality of centroid locations; and
  for the plurality of centroid locations, determining respective final latch clusters and respective final positions of the centroid locations by iteratively:
    adjusting positions of the centroid locations based on positions of latches of associated latch clusters; and
    determining, based on the adjusted positions of the centroid locations and the positions of the plurality of latches within the circuit design, new latch clusters, wherein each new latch cluster comprises a unique subset of the plurality of latches that are associated with a unique one of the plurality of centroid locations.

5. The computer-implemented method of claim 4, wherein adjusting positions of the centroid locations based on positions of latches of associated latch clusters comprises, for each centroid location:
  determining a new position that corresponds to a mean of the positions of the latches of the associated latch cluster; and
  moving the centroid location to the new position.

6. The computer-implemented method of claim 5, wherein the respective final positions of the centroid locations are determined in response to determining that, for each of the centroid locations, the new position is identical to an immediately preceding position of the centroid location.

7. The computer-implemented method of claim 4, wherein determining initial latch clusters comprises:
  for each latch of the plurality of latches, determining a nearest initial centroid location; and
  grouping the plurality of latches into a plurality of initial latch clusters, wherein each of the plurality of initial latch clusters comprises a subset of latches of the plurality of latches that have a same nearest initial centroid location.

8. The computer-implemented method of claim 1, wherein modifying the circuit design to place a local clock buffer controller at each of the plurality of centroid locations within the circuit design comprises, for each of the plurality of centroid locations within the circuit design:
  responsive to determining that an area of the circuit design corresponding to the centroid location is empty, modifying the circuit design to place a local clock buffer controller in the area of the circuit design; and
  responsive to determining that the area of the circuit design corresponding to the centroid location is occupied by another circuit element, modifying the circuit design to place a local clock buffer controller in an empty area that is adjacent to the area of the circuit design.

9. The computer-implemented method of claim 1, wherein connecting each of a plurality of local clock buffers within the circuit design to a nearest local clock buffer controller comprises, for each local clock buffer:
  identifying a domain associated with the local clock buffer; and
  connecting the local clock buffer to a closest local clock buffer controller that is associated with the same domain as the local clock buffer.

10. The computer-implemented method of claim 1, wherein a local clock buffer controller comprises a standardized sub-circuit configured to control up to a maximum number of latches via one or more local clock buffers.

11. A system comprising:
  a memory having computer readable instructions; and
  one or more processors for executing the computer readable instructions, the computer readable instructions controlling the one or more processors to perform operations comprising:
    identifying, from a plurality of latches within a circuit design, a first set of latches associated with a first domain and second set of latches associated with a second domain;
    determining, based on positions of the first set of latches within the circuit design, positions of a first set of centroid locations within the circuit design;
    determining, based on positions of the second set of latches within the circuit design, positions of a second set of centroid locations within the circuit design;
    modifying the circuit design to place a local clock buffer controller of a first type at each of the first set of centroid locations within the circuit design and a local clock buffer controller of a second type at each of the second set of centroid locations within the circuit design; and
    connecting each of a plurality of local clock buffers within the circuit design to a nearest local clock buffer controller of a same type.

12. The system of claim 11, wherein the plurality of centroid locations comprises a number of centroid locations that is determined by dividing a total number of latches of the plurality of latches by a maximum latch capacity of a local clock buffer controller.

13. The system of claim 11, wherein the positions of the plurality of centroid locations within the circuit design are determined using a k-means clustering algorithm.

14. The system of claim 13, wherein using a k-means clustering algorithm comprises:
  placing each of the plurality of centroid locations at a respective initial position;
  determining, based on the respective initial positions of the plurality of centroid locations and the positions of the plurality of latches within the circuit design, initial latch clusters,
wherein each initial latch cluster comprises a unique subset of the plurality of latches that are associated with a unique one of the plurality of centroid locations; and
  for the plurality of centroid locations, determining respective final latch clusters and respective final positions of the centroid locations by iteratively:
    adjusting positions of the centroid locations based on positions of latches of associated latch clusters; and
    determining, based on the adjusted positions of the centroid locations and the positions of the plurality of latches within the circuit design, new latch clusters, wherein each new latch cluster comprises a unique subset of the plurality of latches that are associated with a unique one of the plurality of centroid locations.

15. The system of claim 14, wherein adjusting positions of the centroid locations based on positions of latches of associated latch clusters comprises, for each centroid location:
    determining a new position that corresponds to a mean of the positions of the latches of the associated latch cluster; and
    moving the centroid location to the new position.

16. The system of claim 15, wherein the respective final positions of the centroid locations are determined in response to determining that, for each of the centroid locations, the new position is identical to an immediately preceding position of the centroid location.

17. A computer program product comprising a non-transitory computer readable storage medium having program instructions embodied therewith, the program instructions executable by a computer processor to cause the computer processor to perform a method comprising:
    identifying, from a plurality of latches within a circuit design, a first set of latches associated with a first domain and second set of latches associated with a second domain:
    determining, based on positions of the first set of latches within the circuit design, positions of a first set of centroid locations within the circuit design;
    determining, based on positions of the second set of latches within the circuit design, positions of a second set of centroid locations within the circuit design;
    modifying the circuit design to place a local clock buffer controller of a first type at each of the first set of centroid locations within the circuit design and a local clock buffer controller of a second type at each of the second set of centroid locations within the circuit design; and
    connecting each of a plurality of local clock buffers within the circuit design to a nearest local clock buffer controller of a same y.

18. The computer program product of claim 17, wherein the plurality of centroid locations comprises a number of centroid locations that is determined by dividing a total number of latches of the plurality of latches by a maximum latch capacity of a local clock buffer controller.

19. The computer program product of claim 17, wherein the positions of the plurality of centroid locations within the circuit design are determined using a k-means clustering algorithm.

20. The computer program product of claim 19, wherein using a k-means clustering algorithm comprises:
    placing each of the plurality of centroid locations at a respective initial position;
    determining, based on the respective initial positions of the plurality of centroid locations and the positions of the plurality of latches within the circuit design, initial latch clusters, wherein each initial latch cluster comprises a unique subset of the plurality of latches that are associated with a unique one of the plurality of centroid locations; and
    for the plurality of centroid locations, determining respective final latch clusters and respective final positions of the centroid locations by iteratively:
        adjusting positions of the centroid locations based on positions of latches of associated latch clusters; and
        determining, based on the adjusted positions of the centroid locations and the positions of the plurality of latches within the circuit design, new latch clusters, wherein each new latch cluster comprises a unique subset of the plurality of latches that are associated with a unique one of the plurality of centroid locations.

* * * * *